(12) United States Patent
Rowe et al.

(10) Patent No.: US 11,353,009 B1
(45) Date of Patent: Jun. 7, 2022

(54) INTERMUSCULAR RIDGED BOARDS FOR ARTIFICIAL MUSCLE DEVICES UNDER HEAVY LIFT CONDITIONS

(71) Applicant: Toyota Motor Engineering & Manufacturing North America, Inc., Plano, TX (US)

(72) Inventors: Michael P. Rowe, Pinckney, MI (US); Maduran Palaniswamy, Ann Arbor, MI (US)

(73) Assignee: TOYOTA MOTOR ENGINEERING & MANUFACTURING NORTH AMERICA, INC., Plano, TX (US)

( * ) Notice: Subject to any disclaimer, the term of this patent is extended or adjusted under 35 U.S.C. 154(b) by 0 days.

(21) Appl. No.: 17/216,785

(22) Filed: Mar. 30, 2021

(51) Int. Cl.
    *F03G 7/06*     (2006.01)
    *F15B 15/10*     (2006.01)
    *F15B 21/06*     (2006.01)

(52) U.S. Cl.
    CPC .............. *F03G 7/06* (2013.01); *F15B 15/103* (2013.01); *F15B 21/065* (2013.01)

(58) Field of Classification Search
    CPC ......... F03G 7/06; F15B 21/065; F15B 15/103
    USPC ..................................... 60/512; 310/308–309
    See application file for complete search history.

(56) References Cited

U.S. PATENT DOCUMENTS

| | | | |
|---|---|---|---|
| 6,405,532 B1* | 6/2002 | Shahinpoor | ............... A61F 2/08 60/512 |
| 7,034,432 B1 | 4/2006 | Pelrine et al. | |
| 8,981,621 B2 | 3/2015 | Pelrine et al. | |
| 2011/0078508 A1* | 3/2011 | Komatsu | ................... B25J 9/142 714/37 |
| 2019/0029801 A1 | 1/2019 | Kim et al. | |
| 2020/0000572 A1 | 1/2020 | Lima et al. | |

(Continued)

FOREIGN PATENT DOCUMENTS

CN           206999679 U     2/2018

OTHER PUBLICATIONS

E. Acome, et al., "Hydraulically Amplified Self-Healing Electrostatic Actuators With Muscle-Like Performance," Science Journal, Jan. 5, 2018: vol. 359, Issue 6371, pp. 61-651, Department of Mechanical Engineering & Materials Science and Engineering Program, University of Colorado, Boulder, CO 80309, USA.

(Continued)

*Primary Examiner* — Hoang M Nguyen
(74) *Attorney, Agent, or Firm* — Dinsmore & Shohl LLP

(57) ABSTRACT

An artificial muscle device includes a plurality of intermuscular boards and a plurality of artificial muscles disposed between the intermuscular boards in an alternating pattern and communicatively coupled to a controller. Each of the one or more artificial muscles includes a housing comprising an electrode region and an expandable fluid region, a dielectric fluid housed within the housing, and an electrode pair positioned in the electrode region of the housing, the electrode pair including a first electrode and a second electrode. The electrode pair is actuatable between a non-actuated state and an actuated state such that actuation from the non-actuated state to the actuated state directs the dielectric fluid into the expandable fluid region, expanding the expandable fluid region, thereby applying pressure to the intermuscular boards.

20 Claims, 13 Drawing Sheets

(56) References Cited

U.S. PATENT DOCUMENTS

2021/0284079 A1* 9/2021 Rowe .................... B60R 11/02
2021/0285471 A1* 9/2021 Keplinger ............... F15B 15/10

OTHER PUBLICATIONS

"New carbon fibre arlificial muscles can lift 12,600 times their weight" (https://www.dnaindia.com/science/report-new-carbon-fibre-artificial-muscles-can-lift-12600-times-their-weight-2606214, accessed Apr. 18, 2018).

* cited by examiner

INTERMUSCULAR RIDGED BOARDS FOR ARTIFICIAL MUSCLE DEVICES UNDER HEAVY LIFT CONDITIONS

TECHNICAL FIELD

The present specification generally relates to artificial muscle stacks and, in particular, to artificial muscle stacks that provide greater stroke under heavy pressure.

BACKGROUND

Support structures provide varying performance as weight/pressure increases. As materials in the support structure come under increasing loads, the materials may not perform uniformly. For example, a material may not deform or expand uniformly, which can lead to an uneven amount of compression or expansion. When materials are stacked in a way that the entire stack supports increasing weight, such non-uniform performance can exacerbate the performance of the entire stack.

Accordingly, there exists a need for improved stack displacement and stroke performance under heavy loads.

SUMMARY

In one embodiment, an artificial muscle device includes a plurality of intermuscular boards and one or more artificial muscles disposed between the intermuscular boards in an alternating pattern and communicatively coupled to a controller. Each of the one or more artificial muscles includes a housing comprising an electrode region and an expandable fluid region, a dielectric fluid housed within the housing, and an electrode pair positioned in the electrode region of the housing, the electrode pair including a first electrode and a second electrode. The electrode pair is actuatable between a non-actuated state and an actuated state such that actuation from the non-actuated state to the actuated state directs the dielectric fluid into the expandable fluid region, expanding the expandable fluid region, thereby applying pressure to the intermuscular boards.

In another embodiment, a method for actuating an artificial muscle device includes providing a voltage using a power supply electrically coupled to an electrode pair of each of a plurality of artificial muscles in an artificial muscle stack. The artificial muscles are disposed between intermuscular boards in an alternating pattern. The artificial muscle includes a housing having an electrode region and an expandable fluid region. The electrode pair is positioned in the electrode region of the housing, the electrode pair comprises a first electrode and a second electrode, and a dielectric fluid is housed within the housing. The method further includes applying the voltage to the electrode pair of each artificial muscle, thereby actuating the electrode pair such that the dielectric fluid is directed into the expandable fluid region of the housing and expands the expandable fluid region, thereby applying pressure to each intermuscular board.

In a further embodiment, an artificial muscle device includes a layered actuation structure comprising actuation platforms interleaved with mounting platforms to form actuation cavities therebetween, a plurality of intermuscular boards, and a plurality of artificial muscles disposed between the intermuscular boards in an alternating pattern and communicatively coupled to a controller. Each of the one or more artificial muscles comprise a housing comprising an electrode region and an expandable fluid region, a dielectric fluid housed within the housing, and an electrode pair positioned in the electrode region of the housing. The electrode pair includes a first electrode and a second electrode. The electrode pair is actuatable between a non-actuated state and an actuated state such that actuation from the non-actuated state to the actuated state directs the dielectric fluid into the expandable fluid region, expanding the expandable fluid region, thereby applying pressure to the intermuscular boards. The device further includes at least one artificial muscle and at least one intermuscular board is disposed in each of the actuation cavities. Each intermuscular board is configured to receive uneven pressure from one of the artificial muscle and spread the uneven pressure and apply it in a direction away from the one of the artificial muscles.

These and additional features provided by the embodiments described herein will be more fully understood in view of the following detailed description, in conjunction with the drawings.

BRIEF DESCRIPTION OF THE DRAWINGS

The embodiments set forth in the drawings are illustrative and exemplary in nature and not intended to limit the subject matter defined by the claims. The following detailed description of the illustrative embodiments can be understood when read in conjunction with the following drawings, where like structure is indicated with like reference numerals and in which:

DETAILED DESCRIPTION

Figure 1A:
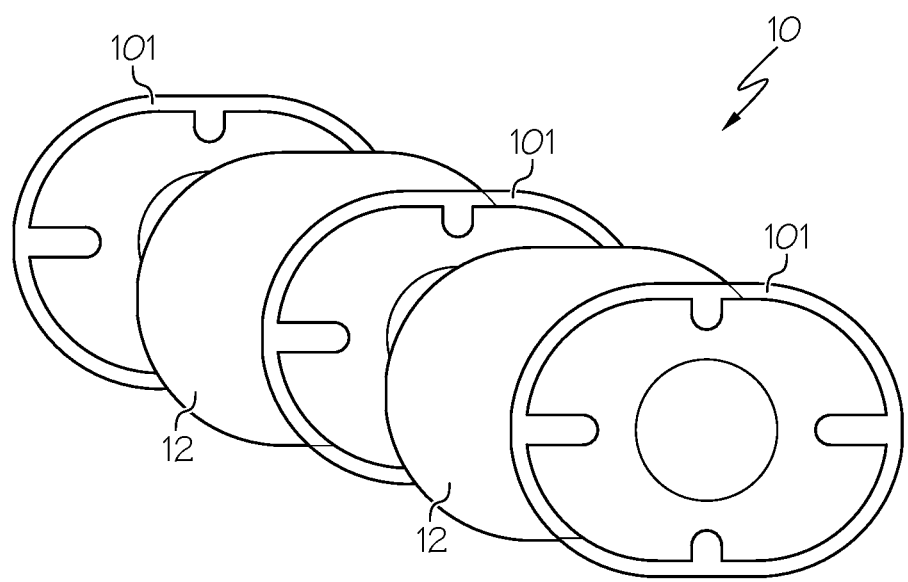
FIG. 1A schematically depicts an exploded view of intermuscular boards disposed between artificial muscles in an alternating pattern, according to one or more embodiments shown and described herein.
Figure 1B:
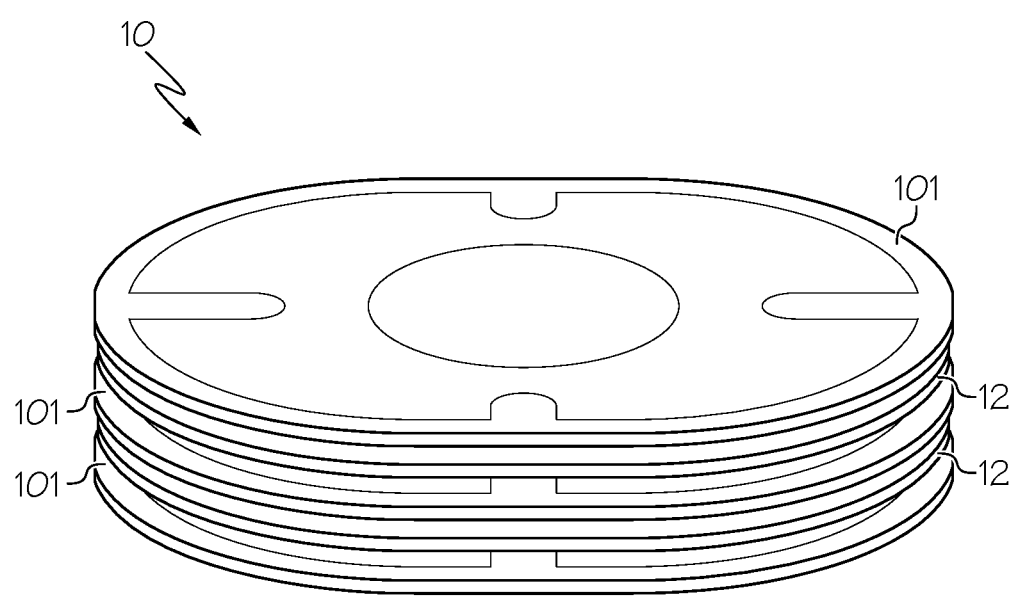
FIG. 1B schematically depicts a perspective view of intermuscular boards disposed between artificial muscles in an alternating pattern, according to one or more embodiments shown and described herein.

Embodiments described herein are directed to artificial muscle devices that include artificial muscles configured to apply pressure to intermuscular boards. The artificial muscle devices described herein include layered actuation structures having actuation platforms interleaved with mounting platforms to form actuation cavities therebetween. The artificial muscle devices described herein include an inner layer, an outer layer, and one or more artificial muscles disposed in an actuation cavity between the inner layer and the outer layer that are actuatable to selectively raise and lower a region of the artificial muscles to provide a selective, on demand inflated expandable fluid region. In particular, the artificial muscles each include an electrode pair that may be drawn together by application of a voltage, thereby pushing dielectric fluid into the expandable fluid region, which applies localized pressure to the intermuscular board. Various embodiments of the artificial muscle device and the operation of which, are described in more detail herein. Whenever possible, the same reference numerals will be used throughout the drawings to refer to the same or like parts.

Referring now to FIGS. 1A-2D, an artificial muscle device 10 is schematically depicted. In FIGS. 1A-1C, embodiments of the artificial muscle device 10 are depicted as having artificial muscles disposed between the intermuscular boards 12 in an alternating pattern in an exploded view in FIGS. 1A and 1n a non-exploded view in FIG. 1B. As described herein, actuation of the one or more artificial muscles 101 may be used to apply pressure to intermuscular boards 12, such as when the artificial muscle device 10 is subjected to weight (i.e., downward pressure). While all artificial muscles 101 may actuate/de-actuate in unison in this embodiment, in other embodiments not all artificial muscles 101 may actuate/de-actuate together. Intermuscular boards 12 may be made of any suitable material(s) such as, by way of non-limiting examples, carbon fiber, steel, aluminum, polycarbonate, titanium, polyethylene, polypropylene, wood, acrylic, and/or ceramic, and the like, including in any combination(s) thereof. An intermuscular board 12 may have uniform or varying thickness in various embodiments ($\frac{1}{16}^{th}$ inch, $\frac{1}{32}^{nd}$ inch, or any other suitable thickness). Artificial muscles 101 may be secured to adjacent intermuscular boards 12 by any suitable mechanism, such as a double-sided adhesive (tape, etc.) at the center (or other suitable location) of each artificial muscle 101 and/or intermuscular board 12. Depending on the material(s) and/or thickness, some embodiments may utilize more than one intermuscular board 12 between artificial muscles 101.

Figure 1C:
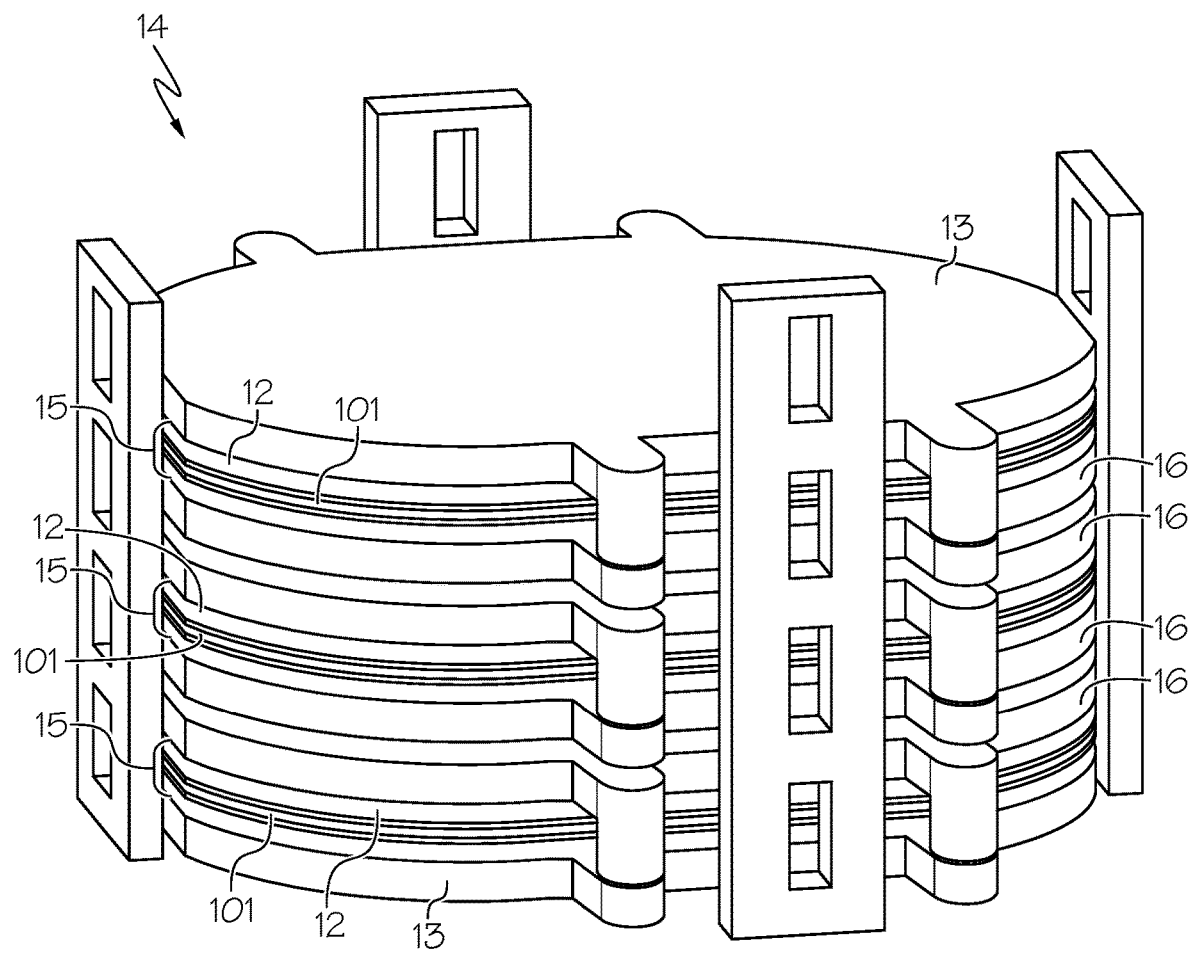
FIG. 1C schematically depicts a layered actuation structure actuation platforms interleaved with mounting platforms to form actuation cavities therebetween to contain intermuscular boards and artificial muscles, according to one or more embodiments shown and described herein.

Referring to FIG. 1C, the artificial muscle device 10 may utilize any suitable type of external structure, such as a layered actuation structure 14 with one or more actuation platforms 16 interleaved with mounting platforms 13 that form actuation cavities 15 therebetween to contain intermuscular boards 12 and artificial muscles 101. By providing such external structure, the actuation cavities 15 may hold the intermuscular boards 12 and/or artificial muscles 101 in place. In some embodiments utilizing such external structure, the intermuscular boards 12 may not be secured to each other or to adjacent artificial muscles 101 as described with respect to FIGS. 1A-1B (double-sided adhesive, piano wire, fasteners, and the like).

Figure 2A:
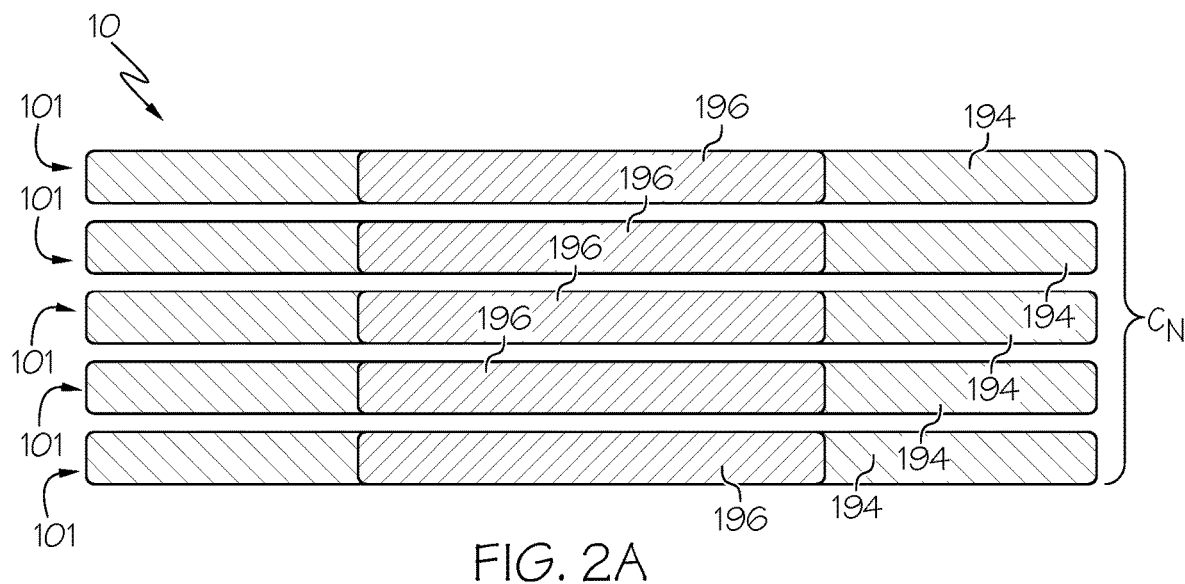
FIG. 2A schematically depicts a side view of a non-actuated muscle stack, according to one or more embodiments shown and described herein.

Referring to FIGS. 2A-2D, artificial muscles 101 may be vertically aligned according to their respective electrode regions 194 and/or expandable fluid regions 196, as described further with respect to FIGS. 4-10. Referring to FIG. 2A, a plurality of vertically-aligned artificial muscles 101 is shown, in which there is no stroke (i.e., vertical displacement) of the artificial muscle device 10, due to the non-actuated state of each artificial muscle 101. While not depicted with interleaving intermuscular boards 12, such interleaving intermuscular boards 12 may be present while the artificial muscles 101 are non-actuated. However, the presence of intermuscular boards 12 while artificial muscles 101 are non-actuated has no/minimal impact on the stroke of the non-actuated artificial muscles 101.

Figure 2B:
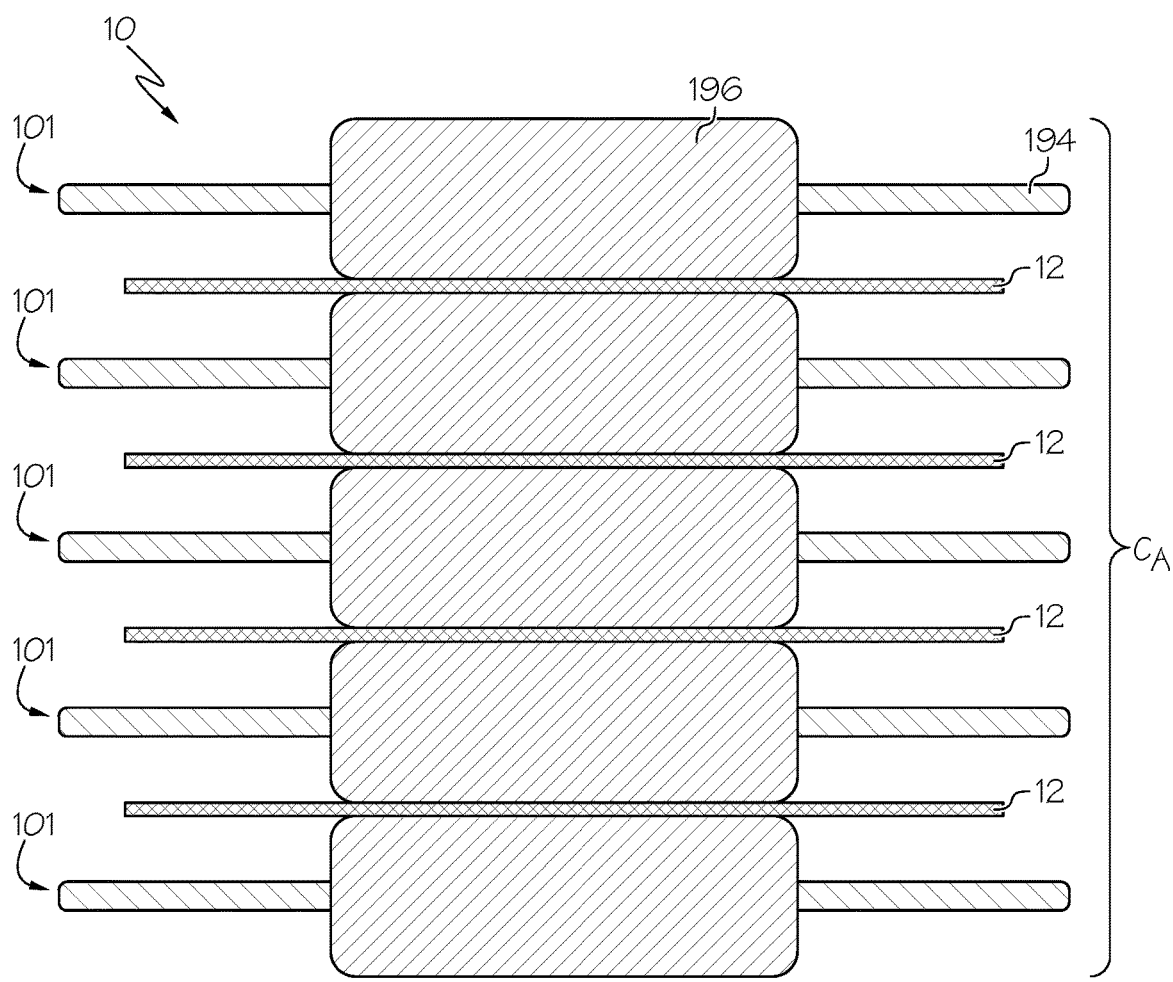
FIG. 2B schematically depicts a side view of an actuated muscle stack under a light load, according to one or more embodiments shown and described herein.

Referring to FIG. 2B, actuated artificial muscles 101 are depicted with interleaving intermuscular boards 12 subject to minimal weight on from atop. Thus, the amount of vertical displacement is maximal, from the non-actuated artificial muscles 101 depicted in FIG. 2A to the same artificial muscles 101 being actuated in FIG. 2B. While intermuscular boards 12 may be rigid, depending on the material(s) and/or thickness, there may be a degree of flexibility. In this way, if the width (or radius/diameter in some embodiments) of the intermuscular boards 12 is equal to or exceeds the width (or radius/diameter in some embodiments) of the artificial muscle 101 between them, then the intermuscular boards 12 may be secured to each other, whether or not either (or both) of the intermuscular boards 12 are secured to the artificial muscle 101. Two intermuscular boards 12 may be secured together at any suitable number of corresponding points along their respective perimeters (or other portions) by any suitable mechanism, such as wire (e.g., piano wire), rope ladder, fasteners, and the like. The width (or radius/diameter) of any intermuscular board 12 may exceed, be equal to, or be less than the width (or radius/diameter) of any adjacent artificial muscle 101 in embodiments.

Figure 2C:
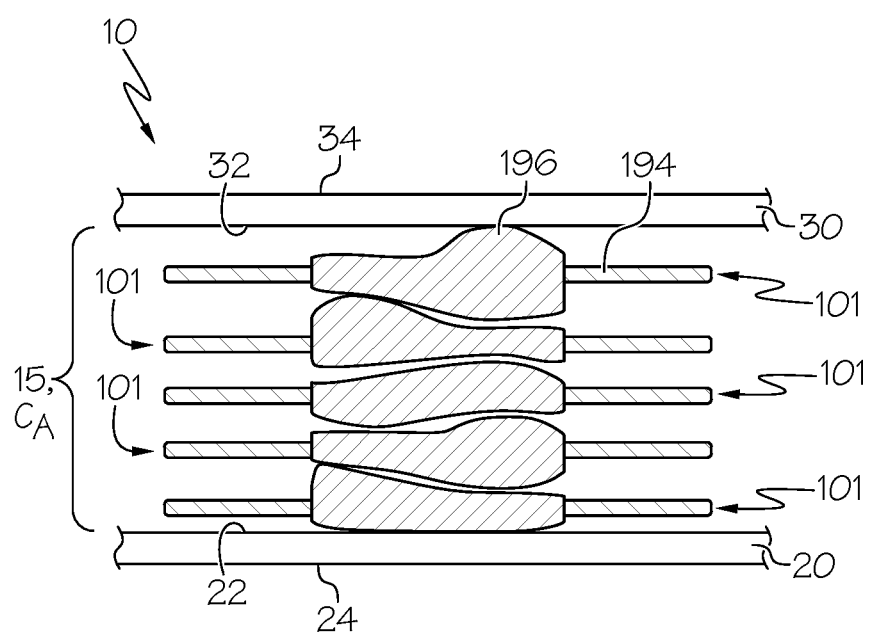
FIG. 2C schematically depicts a side view of an actuated muscle stack under a heavy load without intermuscular boards, according to one or more embodiments shown and described herein.
Figure 2D:
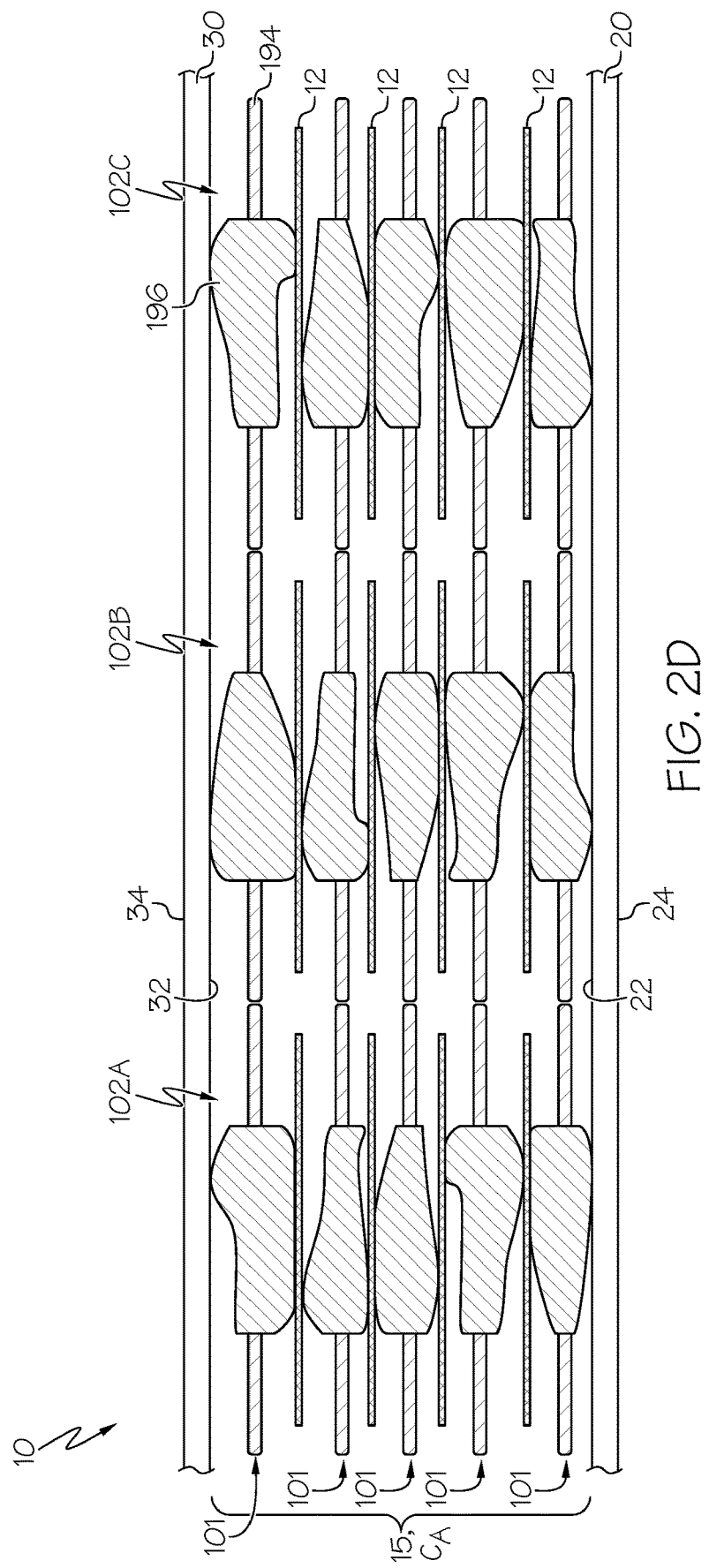
FIG. 2D schematically depicts a side view of an actuated muscle stack under a heavy load with intermuscular boards, according to one or more embodiments shown and described herein.

Referring to FIGS. 2C-2D, the artificial muscle device 10 may include a structure that includes an outer layer 20, an inner layer 30, and an actuation cavity 15 disposed between the outer layer 20 and the inner layer 30. The actuation cavity 15 may correspond to the actuation cavities 15, such as within the layered actuation structure 14 as depicted and described with respect to FIG. 1C. The artificial muscle device 10 may also include one or more artificial muscles 101 disposed between the inner layer 30 and the outer layer 20 of the artificial muscle device 10, for example, within the actuation cavity 15. A schematic cross-section of the artificial muscle device 10 is shown in a state of actuation. In the embodiments depicted in FIGS. 2A-2D, each artificial muscle 101 is one of a plurality of artificial muscles 101. FIGS. 2C-2D depict the same amount of increased weight (1 kilogram, for example) placed upon the actuated artificial muscles 101 depicted in FIG. 2B (where there is minimal or no weight involved). In the embodiment depicted in FIG. 2C, the artificial muscles 101 begin to exert uneven pressure and/or actuate unevenly as the weight place upon them increases. Thus, the total stroke for the artificial muscles 101, which can be equated to the height of the actuation cavity 15 in some embodiments, decreases significantly in comparison to the amount of stroke in FIG. 1B when the artificial muscles 101 are under no or minimal weight. This type of imperfect "muscle flexing" may occur as the load/weight increases upon the artificial muscles 101.

Referring to FIG. 2D, the plurality of artificial muscles 101 may be arranged in a plurality of artificial muscle stacks 102 (e.g., 102A, 102B, 102C, etc.) which may each have artificial muscles 101 disposed between the intermuscular boards 12 in an alternating pattern. Here, each artificial muscle stack 102 may have the artificial muscles 101 disposed between the intermuscular boards 12 in an alternating pattern. The intermuscular boards 12 may receive uneven pressure from the artificial muscles based upon the weight atop the artificial muscle stacks 102. However, the intermuscular boards 12 may take this uneven pressure they receive and spread it more evenly (which may or may not be uniformly applied) in a direction away from the one of the artificial muscle 101 from which it is received (i.e. more evenly spreading the pressure as it travels through the intermuscular board 12). In some embodiments, at least some of the intermuscular boards 12 may tilt based upon the uneven pressure being applied from adjacent artificial muscles 101. In other embodiments, such as the layered actuation structure 14 depicted in FIG. 1C, the intermuscular boards 12 may not tilt due to the structure/reinforcement provided by the layered actuation structure 14. In still other embodiments, securing the ends of intermuscular boards 12 surrounding artificial muscles 101 may prevent or at least alleviate the tilting of such intermuscular boards 12 in the face of uneven pressure from the adjacent artificial muscles 101. While the tilting of intermuscular boards 12 in some embodiments may reduce the stroke of the artificial muscle stack 102 as compared to the intermuscular boards 12 not tilting when subjected to the uneven pressure from adjacent artificial muscles 101, this may still result in greater stroke than the embodiment depicted in FIG. 2C, in which there are no intermuscular boards 12.

Moreover, embodiments are contemplated with a plurality of artificial muscles 101 arranged in a single layer within the actuation cavity 15, in contrast to the artificial muscle stacks 102 of FIG. 2D. In operation, the one or more artificial muscles 101 are actuatable to expand and apply a pressure to the inner layer 30 and/or outer layer 20 of the artificial muscle device 10. Actuation of each artificial muscle 101 of the plurality of artificial muscles 101 may be independent and selective to maintain a periodic actuation pressure. In operation, actuation of the one or more artificial muscles 101 may be controlled by an actuation system 1100, which, as described in more detail with respect to FIG. 11, may include components housed in an onboard control unit 40 coupled to (or contained within) the artificial muscle device 10. This may include, for example, utilizing a pressure value (Pa/pascal, PSI, etc.) to determine the actuation amount of the one or more artificial muscles 101.

The inner layer 30 comprises an inner surface 32 facing the actuation cavity 15 and an outer surface 34. The inner surface 32 may contact at least one artificial muscle 101 and, when worn, the outer surface 34 may contact a user or external object. The outer layer 20 comprises an inner surface 22 facing the actuation cavity 15 and an outer surface 24 facing outward from the artificial muscle device 10. The inner surface 22 of the outer layer 20 may contact at least one artificial muscle 101. The outer layer 20 and/or inner layer 30 may comprise an elastic or rigid material.

Referring again to FIG. 2D, the plurality of artificial muscles 101 are arranged in a plurality of artificial muscles stacks 102. FIG. 2D depicts an embodiment having three artificial muscle stacks 102A-102C in an actuated state. While this illustrative embodiment comprises three artificial muscle stacks 102A-102C, it should be understood that any number of artificial muscles stacks 102 are contemplated. In some embodiments, the expandable fluid region 196 of each artificial muscle 101 of each of the plurality of artificial muscle stacks 102 are coaxially aligned with one another. However, in other embodiments, there may be some offset between the expandable fluid region 196 at least some of the artificial muscles 101 of the plurality of artificial muscles stacks 102. Moreover, while FIG. 2D depicts a plurality of artificial muscle stacks 102, embodiments are contemplated in which the plurality of artificial muscles 101 are arranged in a single layer within the actuation cavity 15, such as depicted in FIGS. 2A-2C. In another embodiment, a single intermuscular board 12 may be utilized to support more than one artificial muscle 101, such as across artificial muscle stacks 102. In this way, one or more intermuscular boards 12 can be utilized across stacks 102.

The one or more artificial muscles 101 each include an electrode pair 104 disposed in a housing 110 together with a dielectric fluid 198 (FIGS. 5-10). The electrode pair 104 is disposed in an electrode region 194 of the housing 110, adjacent an expandable fluid region 196. In operation, voltage may be applied to the electrode pair 104, drawing the electrode pair 104 together, which directs dielectric fluid into the expandable fluid region 196, expanding the expandable fluid region 196. In FIGS. 1A-1C and 2A, one or more artificial muscles 101 are each in a non-actuated state. When the plurality of artificial muscles 101 are not actuated, the cavity 15 comprises a non-actuated thickness $C_N$. When the plurality of artificial muscles 101 are actuated, the actuation cavity 15 comprises an actuated thickness $C_A$. As actuation of the plurality of artificial muscles 101 presses the inner layer 30 inward, the actuated thickness $C_A$ of the actuation cavity 15 is larger than the non-actuated thickness $C_N$ of the actuation cavity 15. While FIGS. 1A-1C and 2A show complete non-actuated states of the artificial muscle device 10, and complete actuated states of the artificial muscle device 10 is depicted in FIGS. 2B-2D, it should be understood that each individual artificial muscle 101 and each individual artificial muscle stack 102 may be independently actuated to provide selective pressure.

In some embodiments, each of the one or more artificial muscles 101 are independently actuatable to apply selective pressure to the inner layer 30 of the artificial muscle device 10. In embodiments comprising the plurality of artificial muscle stacks 102, each artificial muscle stack 102 may be independently actuatable. Moreover, the artificial muscles 101 of a single artificial muscle stack 102 may also be independently actuatable, allowing the displacement stroke applied by a single artificial muscle stack 102 to be altered based on the number of individual artificial muscles 101 of the single artificial muscle stack 102 that are actuated. This facilitates an amount of pressure applied by the artificial muscle device 10. For example, a first artificial muscle stack may be actuated to increase the pressure exerted by an artificial muscle device 10, while a second artificial muscle stack may not be actuated, or actuated to a lesser extent, based upon the amount of pressure needed at a given time. If further pressure becomes necessary, the second artificial muscle stack can be actuated further.

Figure 3:
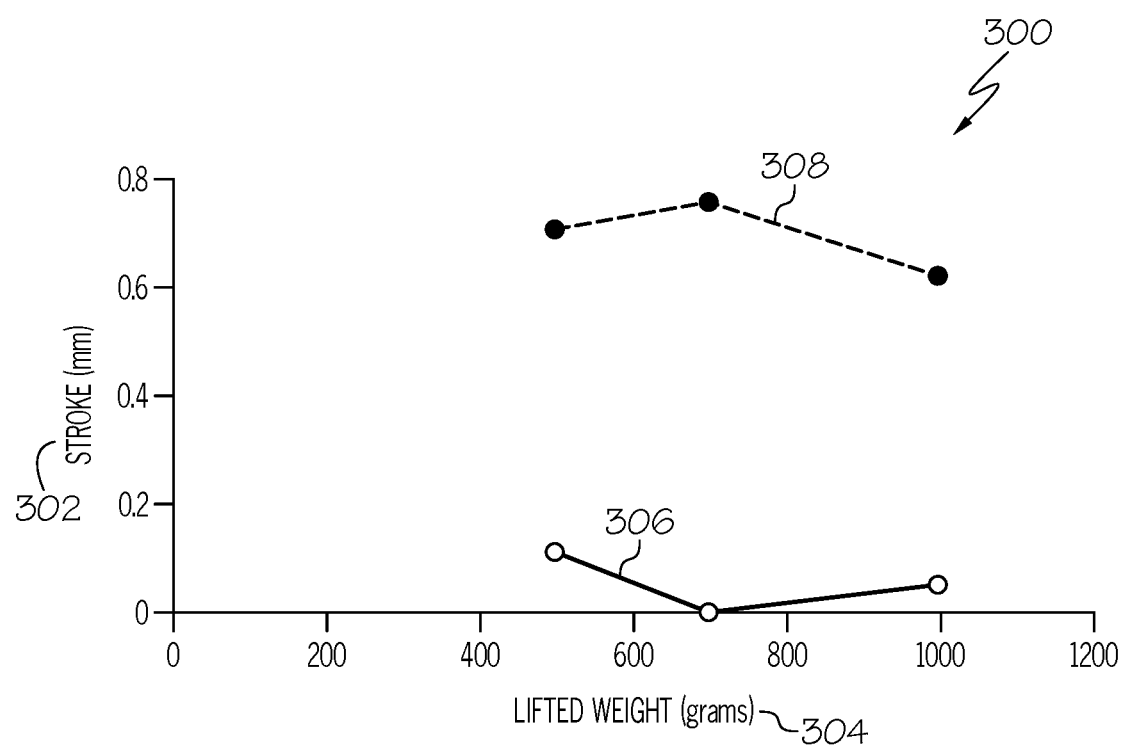
FIG. 3 depicts a comparison chart of artificial muscle displacement with and without intermuscular boards, according to one or more embodiments shown and described herein.

Referring now to FIG. 3, a graph 300 depicting an exemplary comparison of artificial muscle device performance with and without intermuscular boards 12 is depicted in detail. The vertical axis represents an increasing amount of stroke 302 as measured in millimeters, i.e., the amount of displacement provided by a stack of artificial muscles, such as increasing the distance between the inner layer and outer layer depicted in FIG. 2D. The horizontal axis represents an increasing amount of lifted weight 304 as measured in grams. The performance of an artificial muscle device, utilizing a plurality of artificial muscles without any intermuscular boards, is represented by a first plot 306. The performance of an artificial muscle device, utilizing artificial muscles disposed between intermuscular boards in an alternating pattern, is represented by a second plot 308. As can be seen in the graph 300, the stroke of the second plot 308 remains significantly higher (in the range of approximately 0.6 mm to 0.8 mm) than the first plot 306 (in the range of approximately 0 mm to 1 mm), despite some fluctuation in the stroke of each plot as the lifted weight increases from approximately 500 to 1000 grams.

Figure 4:
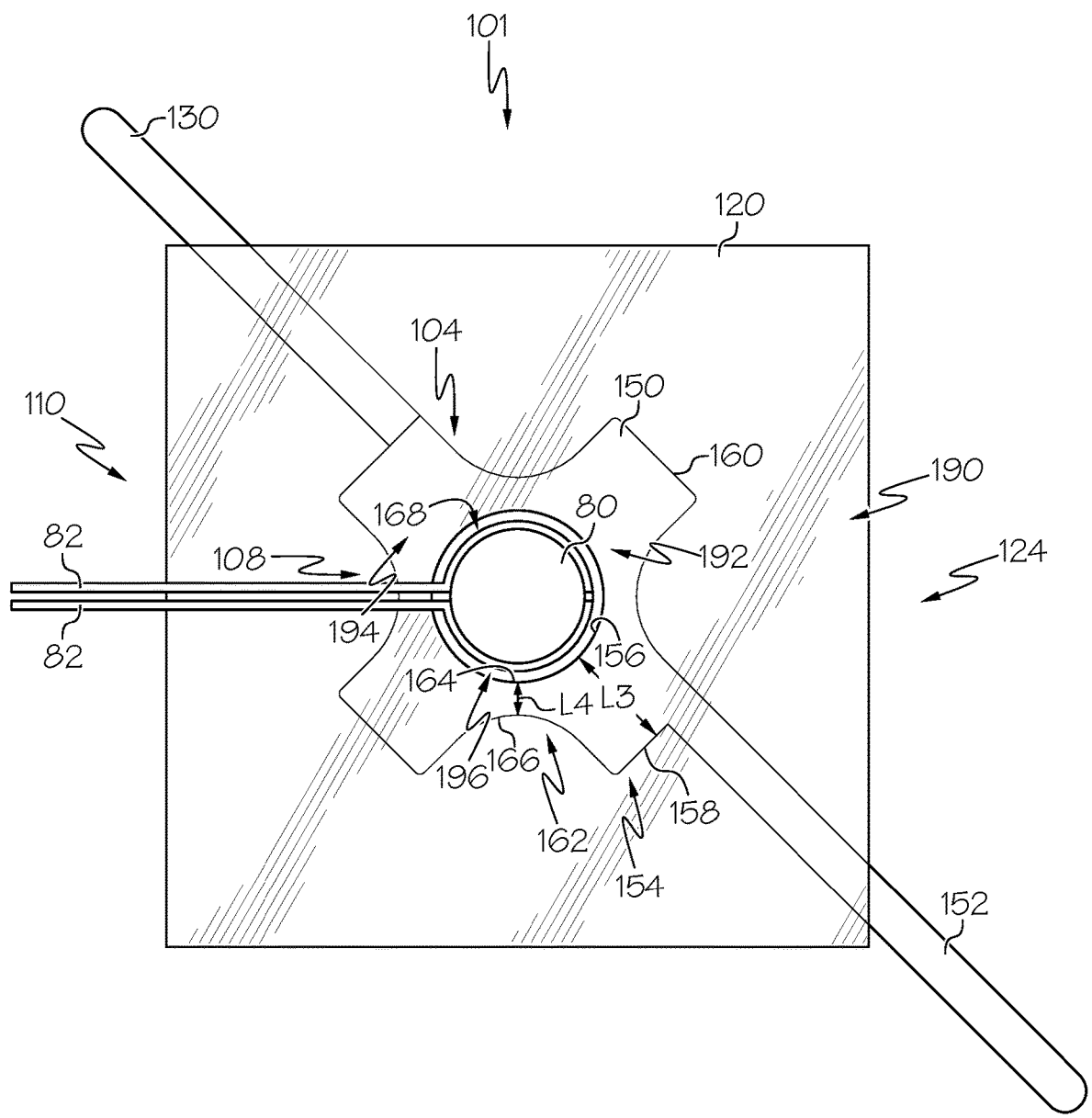
FIG. 4 schematically depicts a top view of an illustrative artificial muscle of the artificial muscle device of FIGS. 1A-2D with a pressure sensor affixed thereon, according to one or more embodiments shown and described herein.
Figure 5:
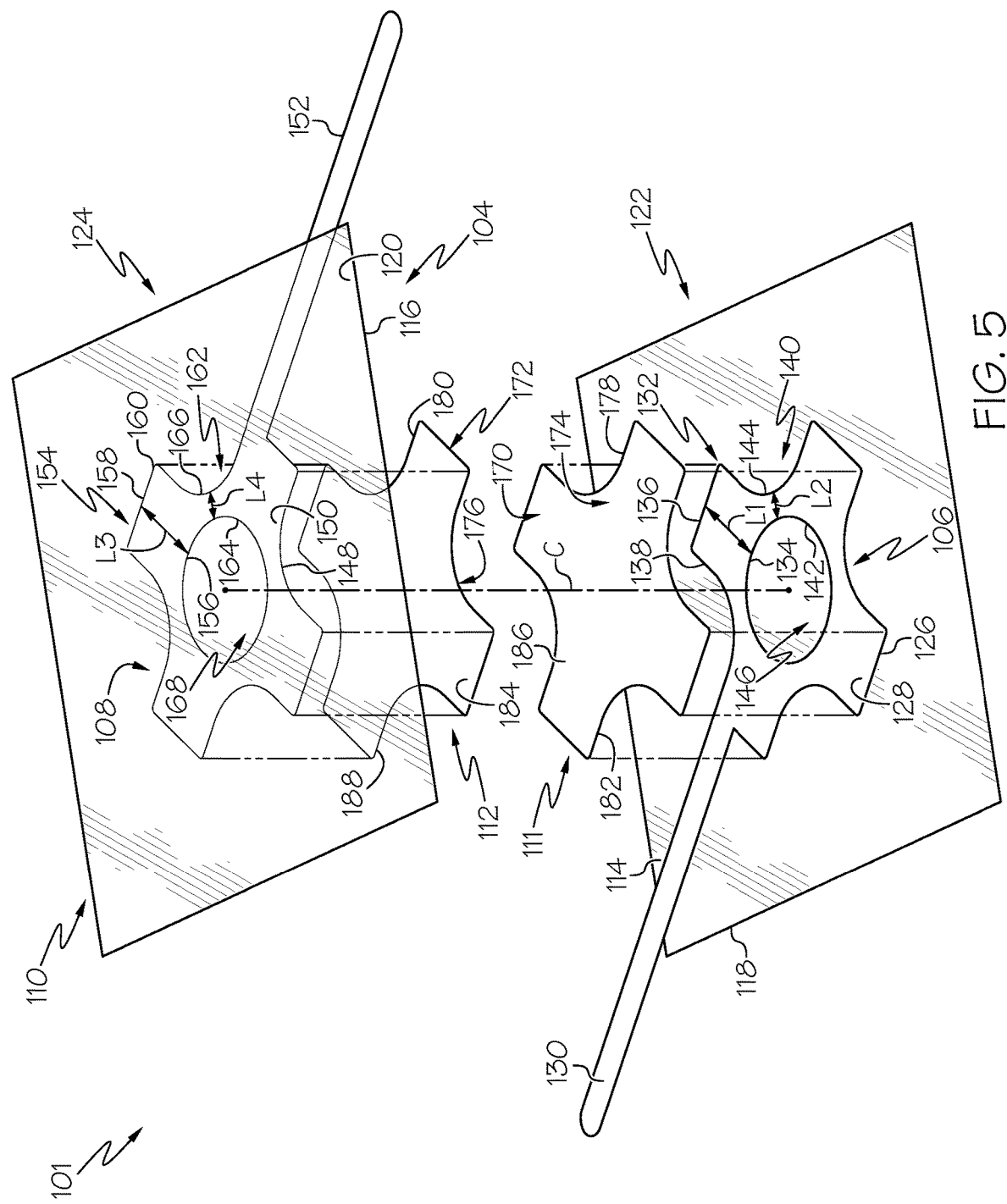
FIG. 5 schematically depicts an exploded view of the artificial muscle of FIG. 4 without the pressure sensor affixed thereon, according to one or more embodiments shown and described herein.
Figure 6:
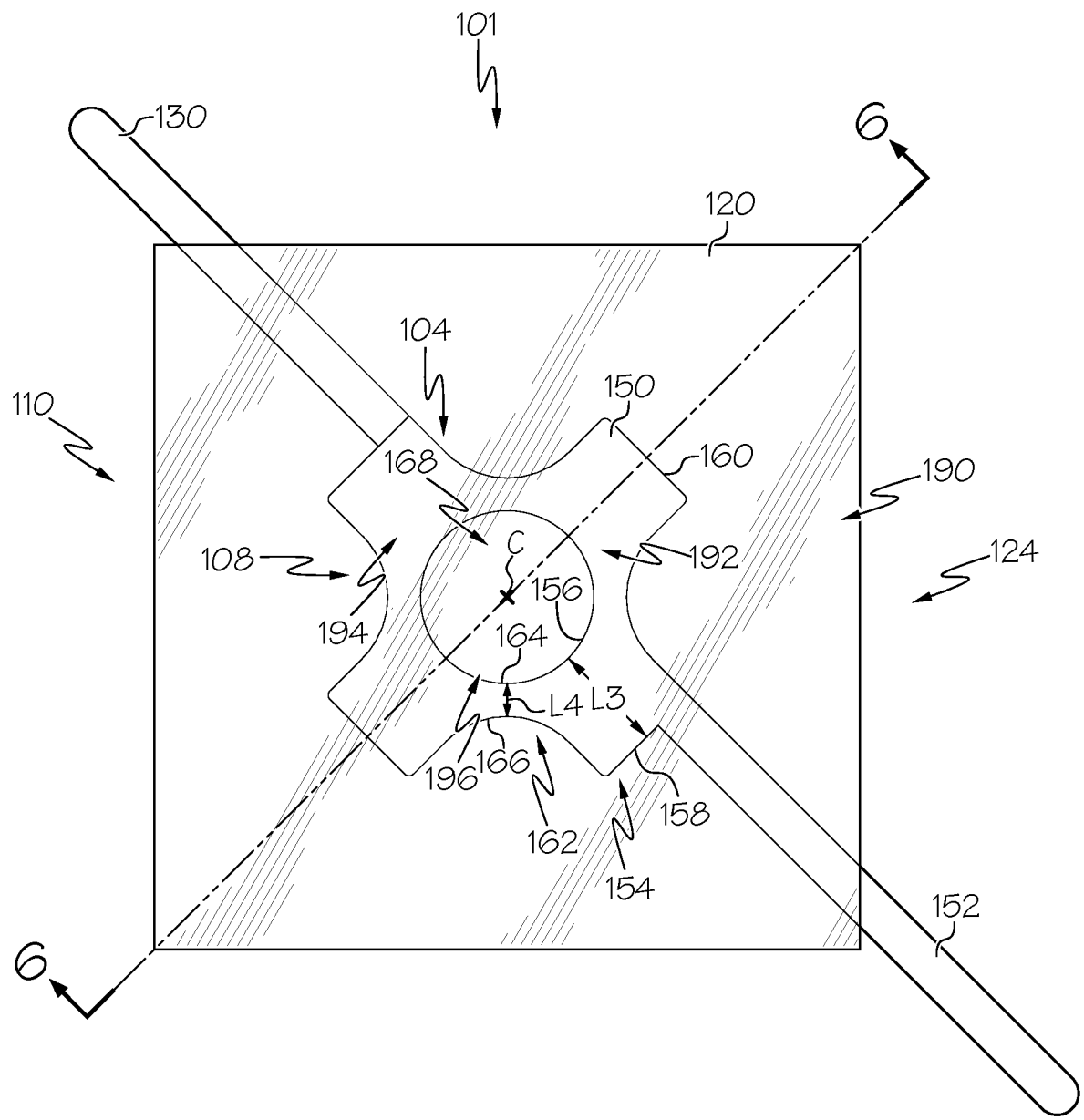
FIG. 6 schematically depicts a top view of the artificial muscle of FIG. 5, according to one or more embodiments shown and described herein.

Referring now to FIGS. 4-6, an example artificial muscle 101 of the artificial muscle device 10 is depicted in more detail. The artificial muscle 101 includes the housing 110, the electrode pair 104, including a first electrode 106 and a second electrode 108, fixed to opposite surfaces of the housing 110, a first electrical insulator layer 111 fixed to the first electrode 106, and a second electrical insulator layer 112 fixed to the second electrode 108. In some embodiments, the housing 110 is a one-piece monolithic layer including a pair of opposite inner surfaces, such as a first inner surface 114 and a second inner surface 116, and a pair of opposite outer surfaces, such as a first outer surface 118 and a second outer surface 120. In some embodiments, the first inner surface 114 and the second inner surface 116 of the housing 110 are heat-sealable. In other embodiments, the housing 110 may be a pair of individually fabricated film layers, such as a first film layer 122 and a second film layer 124. Thus, the first film layer 122 includes the first inner surface 114 and the first outer surface 118, and the second film layer 124 includes the second inner surface 116 and the second outer surface 120.

While the embodiments described herein primarily refer to the housing 110 as comprising the first film layer 122 and the second film layer 124, as opposed to the one-piece housing, it should be understood that either arrangement is contemplated. In some embodiments, the first film layer 122 and the second film layer 124 generally include the same structure and composition. For example, in some embodiments, the first film layer 122 and the second film layer 124 each comprises biaxially oriented polypropylene.

The first electrode 106 and the second electrode 108 are each positioned between the first film layer 122 and the second film layer 124. In some embodiments, the first electrode 106 and the second electrode 108 are each aluminum-coated polyester such as, for example, Mylar®. In addition, one of the first electrode 106 and the second electrode 108 is a negatively charged electrode and the other of the first electrode 106 and the second electrode 108 is a positively charged electrode. For purposes discussed herein, either electrode 106, 108 may be positively charged so long as the other electrode 106, 108 of the artificial muscle 101 is negatively charged.

Figure 11:
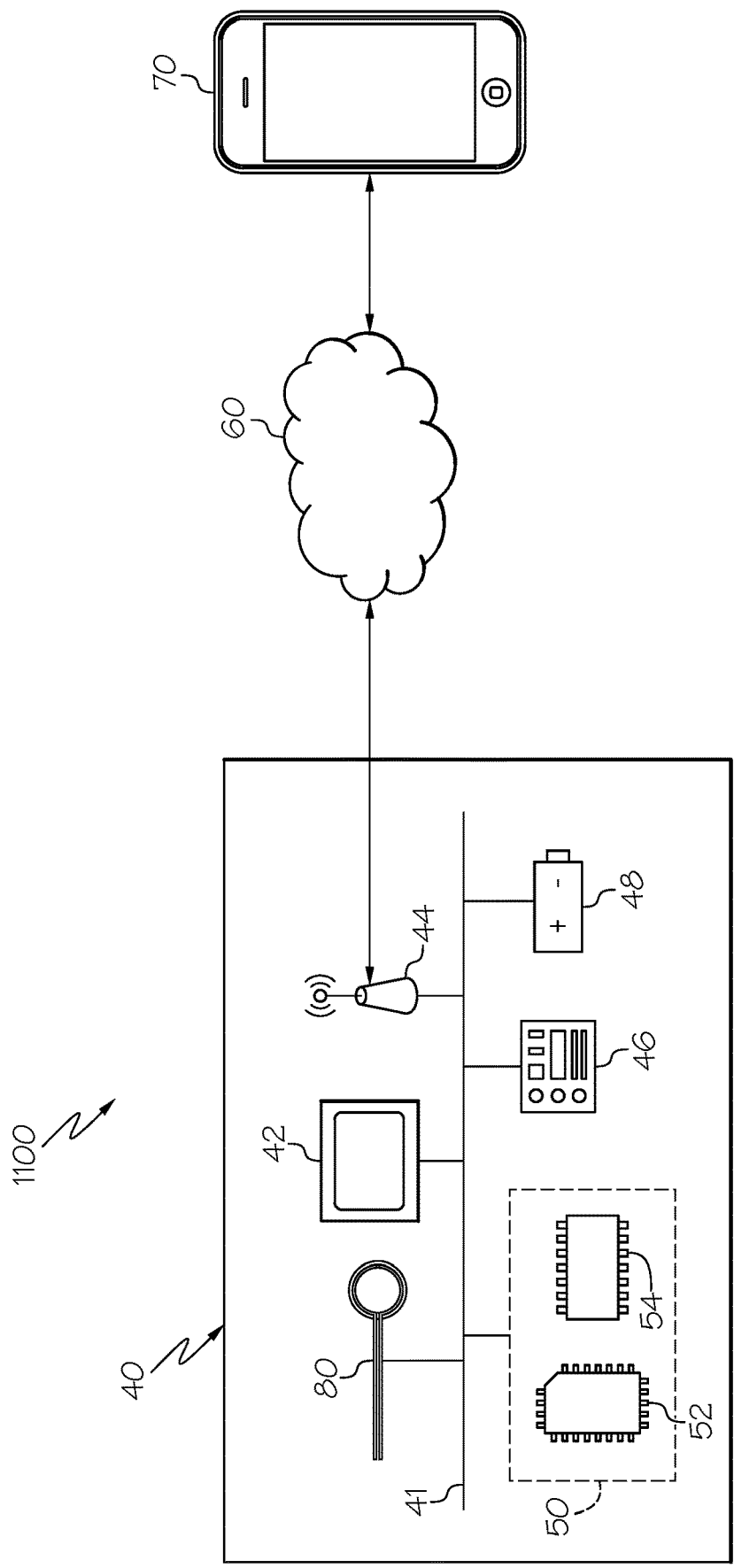
FIG. 11 schematically depicts an actuation system for operating the artificial muscle device of FIGS. 1A-2D, according to one or more embodiments shown and described herein.

The first electrode 106 has a film-facing surface 126 and an opposite inner surface 128. The first electrode 106 is positioned against the first film layer 122, specifically, the first inner surface 114 of the first film layer 122. In addition, the first electrode 106 includes a first terminal 130 extending from the first electrode 106 past an edge of the first film layer 122 such that the first terminal 130 can be connected to a power supply to actuate the first electrode 106. Specifically, the terminal is coupled, either directly or in series, to a power supply and a controller of an actuation system 1100, as shown in FIG. 11. Similarly, the second electrode 108 has a film-facing surface 148 and an opposite inner surface 150. The second electrode 108 is positioned against the second film layer 124, specifically, the second inner surface 116 of the second film layer 124. The second electrode 108 includes a second terminal 152 extending from the second electrode 108 past an edge of the second film layer 124 such that the second terminal 152 can be connected to a power supply and a controller of the actuation system 1100 to actuate the second electrode 108.

The first electrode 106 includes two or more tab portions 132 and two or more bridge portions 140. Each bridge portion 140 is positioned between adjacent tab portions 132, interconnecting these adjacent tab portions 132. Each tab portion 132 has a first end 134 extending radially from a center axis C of the first electrode 106 to an opposite second end 136 of the tab portion 132, where the second end 136 defines a portion of an outer perimeter 138 of the first electrode 106. Each bridge portion 140 has a first end 142 extending radially from the center axis C of the first electrode 106 to an opposite second end 144 of the bridge portion 140 defining another portion of the outer perimeter 138 of the first electrode 106. Each tab portion 132 has a tab length L1 and each bridge portion 140 has a bridge length L2 extending in a radial direction from the center axis C of the first electrode 106. The tab length L1 is a distance from the first end 134 to the second end 136 of the tab portion 132 and the bridge length L2 is a distance from the first end 142 to the second end 144 of the bridge portion 140. The tab length L1 of each tab portion 132 is longer than the bridge length L2 of each bridge portion 140. In some embodiments, the bridge length L2 is 20% to 50% of the tab length L1, such as 30% to 40% of the tab length L1.

In some embodiments, the two or more tab portions 132 are arranged in one or more pairs of tab portions 132. Each pair of tab portions 132 includes two tab portions 132 arranged diametrically opposed to one another. In some embodiments, the first electrode 106 may include only two tab portions 132 positioned on opposite sides or ends of the first electrode 106. In some embodiments, as shown in FIGS. 4-6, the first electrode 106 includes four tab portions 132 and four bridge portions 140 interconnecting adjacent tab portions 132. In this embodiment, the four tab portion 132 are arranged as two pairs of tab portions 132 diametrically opposed to one another. Furthermore, as shown, the first terminal 130 extends from the second end 136 of one of the tab portions 132 and is integrally formed therewith.

Like the first electrode 106, the second electrode 108 includes at least a pair of tab portions 154 and two or more bridge portions 162. Each bridge portion 162 is positioned between adjacent tab portions 154, interconnecting these adjacent tab portions 154. Each tab portion 154 has a first end 156 extending radially from a center axis C of the second electrode 108 to an opposite second end 158 of the tab portion 154, where the second end 158 defines a portion of an outer perimeter 160 of the second electrode 108. Due to the first electrode 106 and the second electrode 108 being coaxial with one another, the center axis C of the first electrode 106 and the second electrode 108 are the same. Each bridge portion 162 has a first end 164 extending radially from the center axis C of the second electrode to an opposite second end 166 of the bridge portion 162 defining another portion of the outer perimeter 160 of the second electrode 108. Each tab portion 154 has a tab length L3 and each bridge portion 162 has a bridge length L4 extending in a radial direction from the center axis C of the second electrode 108. The tab length L3 is a distance from the first end 156 to the second end 158 of the tab portion 154 and the bridge length L4 is a distance from the first end 164 to the second end 166 of the bridge portion 162. The tab length L3 is longer than the bridge length L4 of each bridge portion 162. In some embodiments, the bridge length L4 is 20% to 50% of the tab length L3, such as 30% to 40% of the tab length L3.

In some embodiments, the two or more tab portions 154 are arranged in one or more pairs of tab portions 154. Each pair of tab portions 154 includes two tab portions 154 arranged diametrically opposed to one another. In some embodiments, the second electrode 108 may include only two tab portions 154 positioned on opposite sides or ends of the first electrode 106. In some embodiments, as shown in FIGS. 4-6, the second electrode 108 includes four tab portions 154 and four bridge portions 162 interconnecting adjacent tab portions 154. In this embodiment, the four tab portions 154 are arranged as two pairs of tab portions 154 diametrically opposed to one another. Furthermore, as shown, the second terminal 152 extends from the second end 158 of one of the tab portions 154 and is integrally formed therewith.

Figure 7:
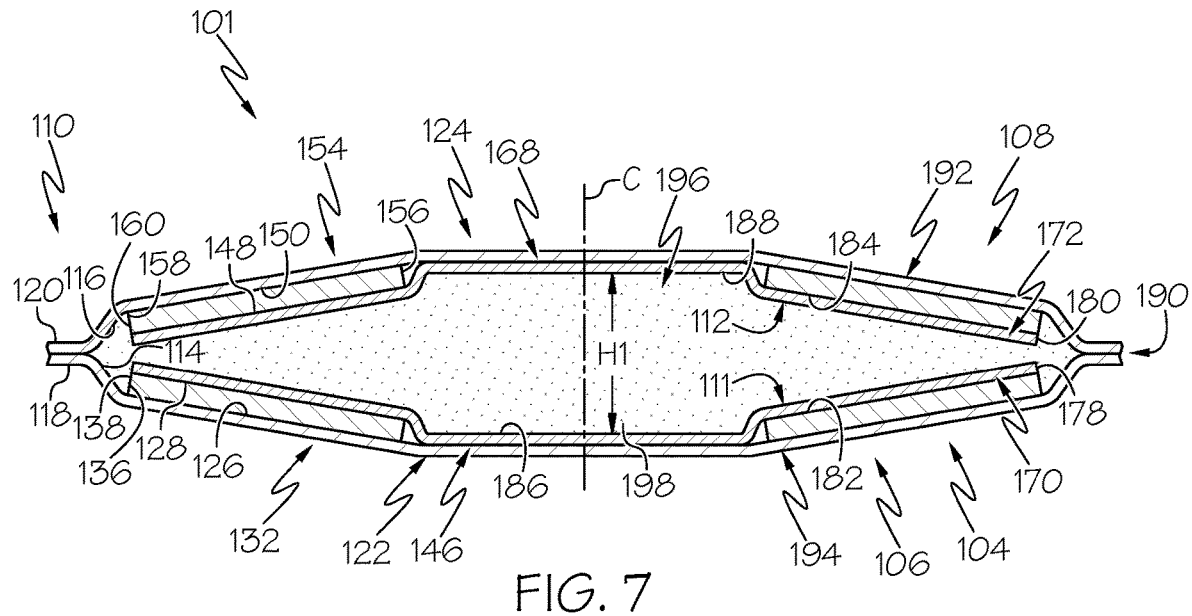
FIG. 7 schematically depicts a cross-sectional view of the artificial muscle of FIG. 5 taken along line 6-6 in FIG. 8 in a non-actuated state, according to one or more embodiments shown and described herein.
Figure 8:
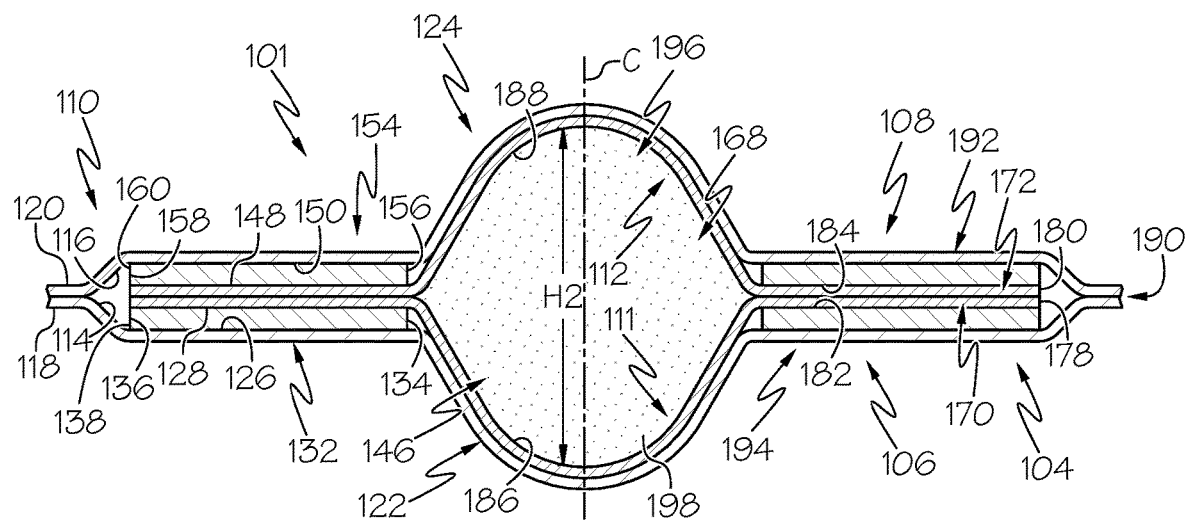
FIG. 8 schematically depicts a cross-sectional view of the artificial muscle of FIG. 5 taken along line 6-6 in FIG. 8 in an actuated state, according to one or more embodiments shown and described herein.
Figure 9:
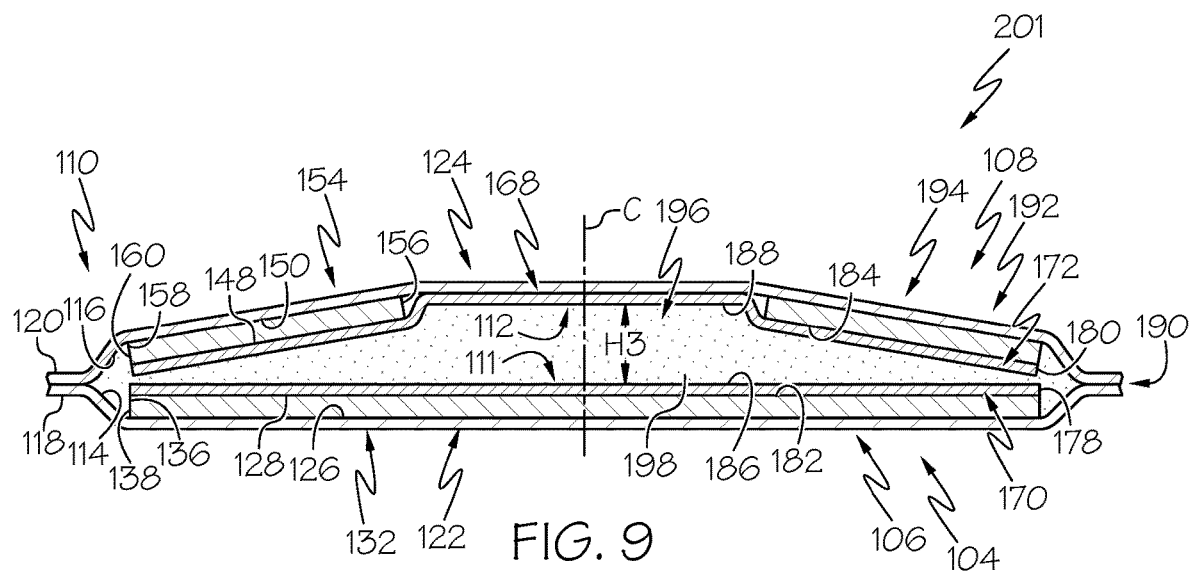
FIG. 9 schematically depicts a cross-sectional view of another illustrative artificial muscle in a non-actuated state, according to one or more embodiments shown and described herein.
Figure 10:
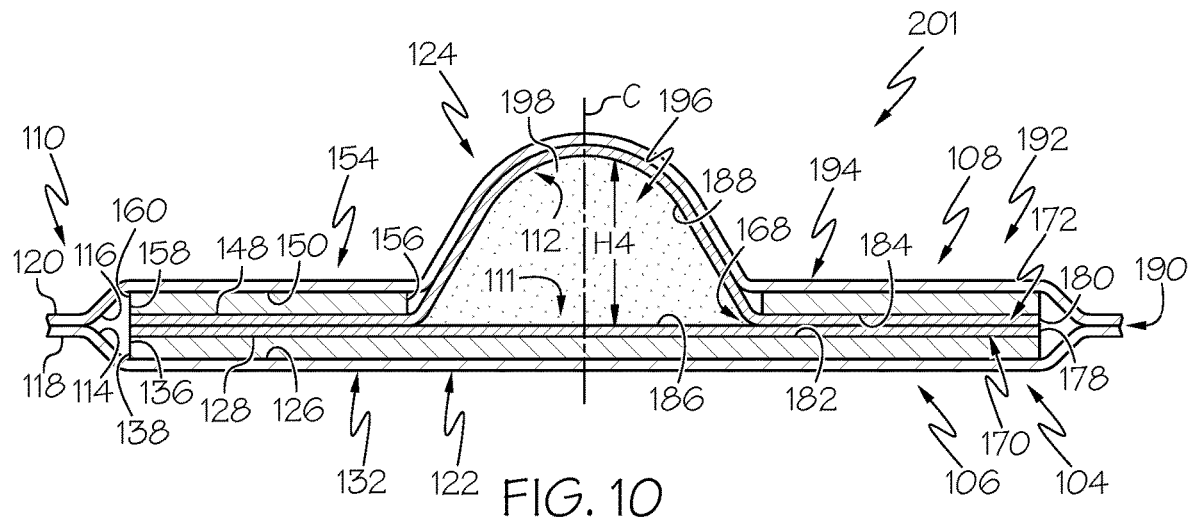
FIG. 10 schematically depicts a cross-sectional view of the artificial muscle of FIG. 5 in an actuated state, according to one or more embodiments shown and described herein.

Referring now to FIGS. 4-10, at least one of the first electrode 106 and the second electrode 108 has a central opening formed therein between the first end 134 of the tab portions 132 and the first end 142 of the bridge portions 140. In FIGS. 7 and 8, the first electrode 106 has a central opening 146. However, it should be understood that the first electrode 106 does not need to include the central opening 146 when a central opening is provided within the second electrode 108, as shown in FIGS. 9 and 10. Alternatively, the second electrode 108 does not need to include the central opening when the central opening 146 is provided within the first electrode 106. Referring to FIGS. 4-10, the first electrical insulator layer 111 and the second electrical insulator layer 112 have a geometry generally corresponding to the first electrode 106 and the second electrode 108, respectively. Thus, the first electrical insulator layer 111 and the second electrical insulator layer 112 each have tab portions 170, 172 and bridge portions 174, 176 corresponding to like portions on the first electrode 106 and the second electrode 108. Further, the first electrical insulator layer 111 and the second electrical insulator layer 112 each have an outer perimeter 178, 180 corresponding to the outer perimeter 138 of the first electrode 106 and the outer perimeter 160 of the second electrode 108, respectively, when positioned thereon.

It should be appreciated that, in some embodiments, the first electrical insulator layer 111 and the second electrical insulator layer 112 generally include the same structure and composition. As such, in some embodiments, the first electrical insulator layer 111 and the second electrical insulator layer 112 each include an adhesive surface 182, 184 and an opposite non-sealable surface 186, 188, respectively. Thus, in some embodiments, the first electrical insulator layer 111 and the second electrical insulator layer 112 are each a polymer tape adhered to the inner surface 128 of the first electrode 106 and the inner surface 150 of the second electrode 108, respectively.

Referring again to FIGS. 4-10, the artificial muscle 101 is shown in its assembled form with the first terminal 130 of the first electrode 106 and the second terminal 152 of the second electrode 108 extending past an outer perimeter of the housing 110, i.e., the first film layer 122 and the second film layer 124. As shown in FIG. 5, the second electrode 108 is stacked on top of the first electrode 106 and, therefore, the first electrode 106, the first film layer 122, and the second film layer 124 are not shown. In its assembled form, the first electrode 106, the second electrode 108, the first electrical insulator layer 111, and the second electrical insulator layer 112 are sandwiched between the first film layer 122 and the second film layer 124. The first film layer 122 is partially sealed to the second film layer 124 at an area surrounding the outer perimeter 138 of the first electrode 106 and the outer perimeter 160 of the second electrode 108. In some embodiments, the first film layer 122 is heat-sealed to the second film layer 124. Specifically, in some embodiments, the first film layer 122 is sealed to the second film layer 124 to define a sealed portion 190 surrounding the first electrode 106 and the second electrode 108. The first film layer 122 and the second film layer 124 may be sealed in any suitable manner, such as using an adhesive, heat sealing, or the like.

The first electrode 106, the second electrode 108, the first electrical insulator layer 111, and the second electrical insulator layer 112 provide a barrier that prevents the first film layer 122 from sealing to the second film layer 124 forming an unsealed portion 192. The unsealed portion 192 of the housing 110 includes the electrode region 194, in which the electrode pair 104 is provided, and the expandable fluid region 196, which is surrounded by the electrode region 194. The central openings 146, 168 of the first electrode 106 and the second electrode 108 form the expandable fluid region 196 and are arranged to be axially stacked on one another. Although not shown, the housing 110 may be cut to conform to the geometry of the electrode pair 104 and reduce the size of the artificial muscle 101, namely, the size of the sealed portion 190.

A dielectric fluid 198 is provided within the unsealed portion 192 and flows freely between the first electrode 106 and the second electrode 108. A "dielectric" fluid as used herein is a medium or material that transmits electrical force without conduction and as such has low electrical conductivity. Some non-limiting example dielectric fluids include perfluoroalkanes, transformer oils, and deionized water. It should be appreciated that the dielectric fluid 198 may be injected into the unsealed portion 192 of the artificial muscle 101 using a needle or other suitable injection device.

Referring now to FIGS. 7 and 8, the artificial muscle 101 is actuatable between a non-actuated state and an actuated state. In the non-actuated state, as shown in FIG. 2A, the first electrode 106 and the second electrode 108 are partially spaced apart from one another proximate the central openings 146, 168 thereof and the first end 134, 156 of the tab portions 132, 154. The second end 136, 158 of the tab portions 132, 154 remain in position relative to one another due to the housing 110 being sealed at the outer perimeter 138 of the first electrode 106 and the outer perimeter 160 of the second electrode 108. In FIG. 2A, at least one of the one or more artificial muscles 101 of the artificial muscle device 10 is in the non-actuated state. In the actuated state, as shown in FIG. 8, the first electrode 106 and the second electrode 108 are brought into contact with and oriented parallel to one another to force the dielectric fluid 198 into the expandable fluid region 196. This causes the dielectric fluid 198 to flow through the central openings 146, 168 of the first electrode 106 and the second electrode 108 and inflate the expandable fluid region 196. In FIGS. 2B-2D, at least one of the one or more artificial muscles 101 of the artificial muscle device 10 is in the actuated state.

Referring now to FIG. 7, the artificial muscle 101 is shown in the non-actuated state. The electrode pair 104 is provided within the electrode region 194 of the unsealed portion 192 of the housing 110. The central opening 146 of the first electrode 106 and the central opening 168 of the second electrode 108 are coaxially aligned within the expandable fluid region 196. In the non-actuated state, the first electrode 106 and the second electrode 108 are partially spaced apart from and non-parallel to one another. Due to the first film layer 122 being sealed to the second film layer 124 around the electrode pair 104, the second end 136, 158 of the tab portions 132, 154 are brought into contact with one another. Thus, dielectric fluid 198 is provided between the first electrode 106 and the second electrode 108, thereby separating the first end 134, 156 of the tab portions 132, 154 proximate the expandable fluid region 196. Stated another way, a distance between the first end 134 of the tab portion 132 of the first electrode 106 and the first end 156 of the tab portion 154 of the second electrode 108 is greater than a distance between the second end 136 of the tab portion 132 of the first electrode 106 and the second end 158 of the tab portion 154 of the second electrode 108. This results in the electrode pair 104 zippering toward the expandable fluid region 196 when actuated. In some embodiments, the first electrode 106 and the second electrode 108 may be flexible. Thus, as shown in FIG. 5, the first electrode 106 and the second electrode 108 are convex such that the second ends 136, 158 of the tab portions 132, 154 thereof may remain close to one another, but spaced apart from one another proximate the central openings 146, 168. In the non-actuated state, the expandable fluid region 196 has a first height H1.

When actuated, as shown in FIG. 8, the first electrode 106 and the second electrode 108 zipper toward one another from the second ends 144, 158 of the tab portions 132, 154 thereof, thereby pushing the dielectric fluid 198 into the expandable fluid region 196. As shown, when in the actuated state, the first electrode 106 and the second electrode 108 are parallel to one another. In the actuated state, the dielectric fluid 198 flows into the expandable fluid region 196 to inflate the expandable fluid region 196. As such, the first film layer 122 and the second film layer 124 expand in opposite directions. In the actuated state, the expandable fluid region 196 has a second height H2, which is greater than the first height H1 of the expandable fluid region 196 when in the non-actuated state. Although not shown, it should be noted that the electrode pair 104 may be partially actuated to a position between the non-actuated state and the actuated state. This would allow for partial inflation of the expandable fluid region 196 and adjustments when necessary.

In order to move the first electrode 106 and the second electrode 108 toward one another, a voltage is applied by a power supply (such as power supply 48 of FIG. 11). In some embodiments, a voltage of up to 10 kV may be provided from the power supply to induce an electric field through the dielectric fluid 198. The resulting attraction between the first electrode 106 and the second electrode 108 pushes the dielectric fluid 198 into the expandable fluid region 196. Pressure from the dielectric fluid 198 within the expandable fluid region 196 causes the first film layer 122 and the first electrical insulator layer 111 to deform in a first axial direction along the center axis C of the first electrode 106 and causes the second film layer 124 and the second electrical insulator layer 112 to deform in an opposite second axial direction along the center axis C of the second electrode 108. Once the voltage being supplied to the first electrode 106 and the second electrode 108 is discontinued, the first electrode 106 and the second electrode 108 return to their initial, non-parallel position in the non-actuated state.

It should be appreciated that the present embodiments of the artificial muscle 101 disclosed herein, specifically, the tab portions 132, 154 with the interconnecting bridge portions 174, 176, provide a number of improvements over actuators that do not include the tab portions 132, 154, such as hydraulically amplified self-healing, electrostatic (HASEL) actuators described in the paper titled "Hydraulically amplified self-healing electrostatic actuators with muscle-like performance" by E. Acome, S. K. Mitchell, T. G. Morrissey, M. B. Emmett, C. Benjamin, M. King, M. Radakovitz, and C. Keplinger (Science 5 Jan. 2018: Vol. 359, Issue 6371, pp. 61-65). Embodiments of the artificial muscle 101 including two pairs of tab portions 132, 154 on each of the first electrode 106 and the second electrode 108, respectively, reduces the overall mass and thickness of the artificial muscle 101, reduces the amount of voltage required during actuation, and decreases the total volume of the artificial muscle 101 without reducing the amount of resulting force after actuation as compared to known HASEL actuators including donut-shaped electrodes having a uniform, radially-extending width. More particularly, the tab portions 132, 154 of the artificial muscle 101 provide zipping fronts that result in increased actuation power by providing localized and uniform hydraulic actuation of the artificial muscle 101 compared to HASEL actuators including donut-shaped electrodes. Specifically, one pair of tab portions 132, 154 provides twice the amount of actuator power per unit volume as compared to donut-shaped HASEL actuators, while two pairs of tab portions 132, 154 provide four times the amount of actuator power per unit volume. The bridge portions 174, 176 interconnecting the tab portions 132, 154 also limit buckling of the tab portions 132, 154 by maintaining the distance between adjacent tab portions 132, 154 during actuation. Because the bridge portions 174, 176 are integrally formed with the tab portions 132, 154, the bridge portions 174, 176 also prevent leakage between the tab portions 132, 154 by eliminating attachment locations that provide an increased risk of rupturing.

In operation, when the artificial muscle 101 is actuated by providing a voltage and applying the voltage to the electrode pair 104 of the artificial muscle 101, expansion of the expandable fluid region 196 produces a force of 3 Newton-millimeters (N·mm) per cubic centimeter ($cm^3$) of actuator volume or greater, such as 4 N·mm per $cm^3$ or greater, 5 N·mm per $cm^3$ or greater, 6 N·mm per $cm^3$ or greater, 7 N·mm per $cm^3$ or greater, 8 N·mm per $cm^3$ or greater, or the like. Providing the voltage may comprise generating the voltage, for example, in an embodiment in which the power supply 48 (FIG. 11) is a battery, converting the voltage, for example in embodiment in which the power supply 48 (FIG. 11) is a power adaptor, or any other known or yet to be developed technique for readying a voltage for application. In one example, when the artificial muscle 101 is actuated by a voltage of 9.5 kilovolts (kV), the artificial muscle 101 provides a resulting force of 5 N. In another example, when the artificial muscle 101 is actuated by a voltage of 10 kV the artificial muscle 101 provides 440% strain under a 500 gram load.

Moreover, the size of the first electrode 106 and the second electrode 108 is proportional to the amount of displacement of the dielectric fluid 198. Therefore, when greater displacement within the expandable fluid region 196 is desired, the size of the electrode pair 104 is increased relative to the size of the expandable fluid region 196. It should be appreciated that the size of the expandable fluid region 196 is defined by the central openings 146, 168 in the first electrode 106 and the second electrode 108. Thus, the degree of displacement within the expandable fluid region 196 may alternatively, or in addition, be controlled by increasing or reducing the size of the central openings 146, 168.

As shown in FIGS. 9 and 10, another embodiment of an artificial muscle 201 is illustrated. The artificial muscle 201 is substantially similar to the artificial muscle 101. As such, like structure is indicated with like reference numerals. However, as shown, the first electrode 106 does not include a central opening. Thus, only the second electrode 108 includes the central opening 168 formed therein. As shown in FIG. 9, the artificial muscle 201 is in the non-actuated state with the first electrode 106 being planar and the second electrode 108 being convex relative to the first electrode 106. In the non-actuated state, the expandable fluid region 196 has a first height H3. In the actuated state, as shown in FIG. 10, the expandable fluid region 196 has a second height H4, which is greater than the first height H3. It should be appreciated that by providing the central opening 168 only in the second electrode 108 as opposed to both the first electrode 106 and the second electrode 108, the total deformation may be formed on one side of the artificial muscle 201. In addition, because the total deformation is formed on only one side of the artificial muscle 201, the second height H4 of the expandable fluid region 196 of the artificial muscle 201 extends further from a longitudinal axis perpendicular to the central axis C of the artificial muscle 201 than the second height H2 of the expandable fluid region 196 of the artificial muscle 101 when all other dimensions, orientations, and volume of dielectric fluid are the same. It should be understood that embodiments of the artificial muscle 201 may be used together with or in place of the one or more artificial muscles 101 of the artificial muscle device 10 of FIGS. 1A-2D.

In some embodiments, as shown in FIG. 4, a pressure sensor 80 may reside on the housing 110 and be aligned with the central opening 168 or central opening 146, which are openings in the first electrode 106 and second electrode 108, respectively. In some embodiments, the pressure sensor 80 may be disposed on the expandable fluid region 196 of the housing 110. In other embodiments, the pressure sensor 80 may be located on any suitable surface of the housing 110 or an artificial muscle 101.

In some embodiments, different pressure sensors 80 within the artificial muscle device 10 may be located at different locations with respect to different housings 110 and/or an artificial muscles 101. In this embodiment, the pressure sensor 80 has two sensor protrusions 82 that extend outwardly from the pressure sensor 80 and may be disposed between the inner layer 30 and outer layer 20. Sensor protrusions may be used, for example, to wirelessly communicate with other components, such as a controller 50 (as shown in FIG. 11) and/or other wireless sensors located on other artificial muscles 101. In other embodiments, any number of sensor protrusions 82 of any shape, size, and/or configuration may be utilized. In still other embodiments, the pressure sensor 80 may have no sensor protrusions 82.

In some embodiments, the pressure sensor 80 may be of any suitable type, such as, by way of non-limiting example, absolute, gauge, or differential pressure sensors. Sensing by the pressure sensor 80 may include any suitable technique such as resistive sensing, capacitive sensing, piezoelectric sensing, optical sensing, micro electro-mechanical system (MEMS), or any other suitable type of pressure sensing technique. Output from the pressure sensor 80 may be by millivolt-output transducers, volt-output transducers, transmitters, or any other suitable components.

Referring now to FIG. 11, an actuation system 1100 may be provided for operating the artificial muscle device 10, in particular, operate the one or more artificial muscles 101 of the artificial muscle device 10. The actuation system 1100 may comprise a controller 50, the one or more pressure sensors 80, an operating device 46, a power supply 48, a display device 42, network interface hardware 44, and a communication path 41 communicatively coupled these components, some or all of which may be disposed in the onboard control unit 40.

The controller 50 may comprise a processor 52 and a non-transitory electronic memory 54 to which various components are communicatively coupled. In some embodiments, the processor 52 and the non-transitory electronic memory 54 and/or the other components are included within a single device. In other embodiments, the processor 52 and the non-transitory electronic memory 54 and/or the other components may be distributed among multiple devices that are communicatively coupled. The controller 50 may include non-transitory electronic memory 54 that stores a set of machine-readable instructions. The processor 52 may execute the machine-readable instructions stored in the non-transitory electronic memory 54. The non-transitory electronic memory 54 may comprise RAM, ROM, flash memories, hard drives, or any device capable of storing machine-readable instructions such that the machine-readable instructions can be accessed by the processor 52. Accordingly, the actuation system 1100 described herein may be implemented in any computer programming language, as pre-programmed hardware elements, or as a combination of hardware and software components. The non-transitory electronic memory 54 may be implemented as one memory module or a plurality of memory modules.

In some embodiments, the non-transitory electronic memory 54 includes instructions for executing the functions of the actuation system 1100. The instructions may include instructions for operating the artificial muscle device 10, for example, instructions for actuating the one or more artificial muscles 101, individually or collectively, and actuating the artificial muscles stacks, individually or collectively.

The processor 52 may be any device capable of executing machine-readable instructions. For example, the processor 52 may be an integrated circuit, a microchip, a computer, or any other computing device. The non-transitory electronic memory 54 and the processor 52 are coupled to the communication path 41 that provides signal interconnectivity between various components and/or modules of the actuation system 1100. Accordingly, the communication path 41 may communicatively couple any number of processors with one another, and allow the modules coupled to the communication path 41 to operate in a distributed computing environment. Specifically, each of the modules may operate as a node that may send and/or receive data. As used herein, the term "communicatively coupled" means that coupled components are capable of exchanging data signals with one another such as, for example, electrical signals via conductive medium, electromagnetic signals via air, optical signals via optical waveguides, and the like.

As schematically depicted in FIG. 11, the communication path 41 communicatively couples the processor 52 and the non-transitory electronic memory 54 of the controller 50 with a plurality of other components of the actuation system 1100. For example, the actuation system 1100 depicted in FIG. 11 includes the processor 52 and the non-transitory electronic memory 54 communicatively coupled with the pressure sensor 80, operating device 46, and the power supply 48.

The operating device 46 allows for a user to control operation of the artificial muscles 101 of the artificial muscle device 10. In some embodiments, the operating device 46 may be a switch, toggle, button, or any combination of controls to provide user operation. The operating device 46 is coupled to the communication path 41 such that the communication path 41 communicatively couples the operating device 46 to other modules of the actuation system 1100. The operating device 46 may provide a user interface for receiving user instructions as to a specific operating configuration of the artificial muscle device 10, such as an amount desired actuation.

The power supply 48 (e.g., battery) provides power to the one or more artificial muscles 101 of the artificial muscle device 10. In some embodiments, the power supply 48 is a rechargeable direct current power source. It is to be understood that the power supply 48 may be a single power supply or battery for providing power to the one or more artificial muscles 101 of the artificial muscle device 10. A power adapter (not shown) may be provided and electrically coupled via a wiring harness or the like for providing power to the one or more artificial muscles 101 of the artificial muscle device 10 via the power supply 48. Indeed, the power supply 48 is a device that can receive power at one level (e.g., one voltage, power level, or current) and output power at a second level (e.g., a second voltage, power level, or current).

In some embodiments, the actuation system 1100 also includes a display device 42. The display device 42 is coupled to the communication path 41 such that the communication path 41 communicatively couples the display device 42 to other modules of the actuation system 1100. The display device 42 may be located on the artificial muscle device 10, for example, as part of the onboard control unit 40, and may output a notification in response to an actuation state of the artificial muscles 101 of the artificial muscle device 10 or indication of a change in the actuation state of the one or more artificial muscles 101 of the artificial muscle device 10. The display device 42 may be a touchscreen that, in addition to providing optical information, detects the presence and location of a tactile input upon a surface of or adjacent to the display device 42. Accordingly, the display device 42 may include the operating device 46 and receive mechanical input directly upon the optical output provided by the display device 42. For example, a user may be able to specify a desired actuation pressure value.

In some embodiments, the actuation system 1100 includes network interface hardware 44 for communicatively coupling the actuation system 1100 to a portable device 70 via a network 60. The portable device 70 may include, without limitation, a smartphone, a tablet, a personal media player, or any other electric device that includes wireless communication functionality. It is to be appreciated that, when provided, the portable device 70 may serve to provide user commands to the controller 50, instead of the operating device 46. As such, a user may be able to control or set a program for controlling the artificial muscles 101 of the artificial muscle device 10 utilizing the controls of the operating device 46. Thus, the artificial muscles 101 of the artificial muscle device 10 may be controlled remotely via the portable device 70 wirelessly communicating with the controller 50 via the network 60. For example, the user may be able to specify a desired pressure value. The portable device 70 may also receive and display pressure readings from one or more pressure sensors 80 associated with one or more of the artificial muscles 101.

It should now be understood that embodiments described herein are directed to artificial muscle devices that include artificial muscles disposed between intermuscular boards in an alternating pattern. Actuation of the artificial muscles of an artificial muscle device under heavy loads may apply an uneven actuation pressure to the intermuscular boards. The intermuscular boards may more uniformly apply the actuation pressure, resulting in improved lifting and/or stroke performance under such heavy loads.

It is noted that the terms "substantially" and "about" may be utilized herein to represent the inherent degree of uncertainty that may be attributed to any quantitative comparison, value, measurement, or other representation. These terms are also utilized herein to represent the degree by which a quantitative representation may vary from a stated reference without resulting in a change in the basic function of the subject matter at issue.

While particular embodiments have been illustrated and described herein, it should be understood that various other changes and modifications may be made without departing from the scope of the claimed subject matter. Moreover, although various aspects of the claimed subject matter have been described herein, such aspects need not be utilized in combination. It is therefore intended that the appended claims cover all such changes and modifications that are within the scope of the claimed subject matter.

What is claimed is:

1. An artificial muscle device comprising:
a plurality of intermuscular boards; and
one or more artificial muscles disposed between the intermuscular boards in an alternating pattern and communicatively coupled to a controller, wherein each of the one or more artificial muscles comprise:
a housing comprising an electrode region and an expandable fluid region;
a dielectric fluid housed within the housing; and
an electrode pair positioned in the electrode region of the housing, the electrode pair comprising a first electrode and a second electrode, wherein the electrode pair is actuatable between a non-actuated state and an actuated state such that actuation from the non-actuated state to the actuated state directs the dielectric fluid into the expandable fluid region, expanding the expandable fluid region, thereby applying pressure to the intermuscular boards.

2. The artificial muscle device of claim 1, wherein at least one intermuscular board is secured to an adjacent artificial muscle with a double sided adhesive.

3. The artificial muscle device of claim 1, wherein at least one intermuscular board comprises carbon fiber, steel, aluminum, polycarbonate, titanium, polyethylene, polypropylene, wood, acrylic, or ceramic.

4. The artificial muscle device of claim 1, wherein at least one intermuscular board has a width equivalent to an adjacent artificial muscle.

5. The artificial muscle device of claim 1, wherein two intermuscular boards each have a width exceeding that of an artificial muscle disposed therebetween.

6. The artificial muscle device of claim 1, wherein at least two of the plurality of intermuscular boards are secured together at a plurality of corresponding points along their respective perimeters.

7. The artificial muscle device of claim 1, wherein at least one artificial muscle has a width exceeding that of an adjacent intermuscular board.

8. The artificial muscle device of claim 1, wherein two intermuscular boards are located between two adjacent artificial muscles.

9. The artificial muscle device of claim 1, further comprising a layered actuation structure comprising one or more actuation platforms interleaved with one or more mounting platforms to form one or more actuation cavities therebetween.

10. The artificial muscle device of claim 9, wherein at least one artificial muscle and at least one intermuscular board is disposed in each of the one or more actuation cavities.

11. The artificial muscle device of claim 1, wherein each intermuscular board is configured to:
upon receipt of uneven pressure from one of the plurality of artificial muscles, spread the uneven pressure and apply it in a direction away from the one of the plurality of artificial muscles.

12. The artificial muscle device of claim 1, wherein at least one intermuscular board is configured to maintain its orientation as uneven pressure is applied from an adjacent artificial muscle.

13. The artificial muscle device of claim 1, wherein at least one intermuscular board is configured to tilt as uneven pressure is applied from an adjacent artificial muscle.

14. The artificial muscle device of claim 1, wherein:
the first electrode and the second electrode each comprise two or more tab portions and two or more bridge portions;
each of the two or more bridge portions interconnects adjacent tab portions; and
at least one of the first electrode and the second electrode comprises a central opening positioned between the two or more tab portions and encircling the expandable fluid region.

15. The artificial muscle device of claim 14, wherein the first electrode and the second electrode each includes two pairs of tab portions and two pairs of bridge portions, each bridge portion interconnecting adjacent a pair of adjacent tab portions, each tab portion diametrically opposing an opposite tab portion.

16. The artificial muscle device of claim 14, wherein:
when the electrode pair is in the non-actuated state, the first electrode and the second electrode are non-parallel to one another; and
when the electrode pair is in the actuated state, the first electrode and the second electrode are parallel to one another, such that the first electrode and the second electrode are configured to zipper toward one another and toward the central opening when actuated from the non-actuated state to the actuated state.

17. A method for actuating an artificial muscle device, the method comprising:
providing a voltage using a power supply electrically coupled to an electrode pair of each of a plurality of artificial muscles in an artificial muscle stack, the plurality of artificial muscles disposed between intermuscular boards in an alternating pattern, wherein:
the plurality of artificial muscles each comprise a housing having an electrode region and an expandable fluid region;
the electrode pair is positioned in the electrode region of the housing;
the electrode pair comprises a first electrode and a second electrode; and
a dielectric fluid is housed within the housing; and
applying the voltage to the electrode pair of each artificial muscle, thereby actuating the electrode pair such that the dielectric fluid is directed into the expandable fluid region of the housing and expands the expandable fluid region, thereby applying pressure to each intermuscular board.

18. The method of claim 17, further comprising unevenly applying pressure against one of the intermuscular boards such that the uneven pressure is spread by the intermuscular board in a direction away from the one of the plurality of artificial muscles.

19. An artificial muscle device comprising:
a layered actuation structure comprising actuation platforms interleaved with mounting platforms to form actuation cavities therebetween;
a plurality of intermuscular boards;
a plurality of artificial muscles disposed between the intermuscular boards in an alternating pattern and communicatively coupled to a controller, wherein each of the one or more artificial muscles comprise:
a housing comprising an electrode region and an expandable fluid region;
a dielectric fluid housed within the housing; and
an electrode pair positioned in the electrode region of the housing, the electrode pair comprising a first electrode and a second electrode, wherein the electrode pair is actuatable between a non-actuated state and an actuated state such that actuation from the non-actuated state to the actuated state directs the dielectric fluid into the expandable fluid region, expanding the expandable fluid region, thereby applying pressure to the intermuscular boards,
wherein:
at least one artificial muscle and at least one intermuscular board is disposed in each of the actuation cavities; and
each intermuscular board is configured to:
receive uneven pressure from one of the plurality of artificial muscles; and
spread the uneven pressure and apply it in a direction away from the one of the plurality of artificial muscles.

20. The artificial muscle device of claim 19 comprising:
the first electrode and the second electrode each comprise two or more tab portions and two or more bridge portions;
each of the two or more bridge portions interconnects adjacent tab portions; and
at least one of the first electrode and the second electrode comprises a central opening positioned between the two or more tab portions and encircling the expandable fluid region.

* * * * *

UNITED STATES PATENT AND TRADEMARK OFFICE
CERTIFICATE OF CORRECTION

PATENT NO. : 11,353,009 B1
APPLICATION NO. : 17/216785
DATED : June 7, 2022
INVENTOR(S) : Michael P. Rowe and Maduran Palaniswamy It is certified that error appears in the above-identified patent and that said Letters Patent is hereby corrected as shown below:

On the Title Page

In page 2, Column 1, item (56), other publications, cite no. 1, delete "arlificial" and insert --artificial--, therefor.

In the Specification

In Column 3, Line(s) 56, after "exploded view in", delete "FIGS. 1A and 1n" and insert --FIG. 1A and in--, therefor.

Signed and Sealed this
Ninth Day of August, 2022

Katherine Kelly Vidal
*Director of the United States Patent and Trademark Office*